US012558828B2

(12) United States Patent (10) Patent No.: US 12,558,828 B2
Bisetto et al. (45) Date of Patent: Feb. 24, 2026

(54) INJECTION MOLDING APPARATUS

(71) Applicant: INGLASS S.P.A., San Polo di Piave (IT)

(72) Inventors: Massimo Bisetto, San Polo di Piave (IT); Massimo De Nadai, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 259 days.

(21) Appl. No.: 18/232,385

(22) Filed: Aug. 10, 2023

(65) Prior Publication Data

US 2024/0058999 A1     Feb. 22, 2024

(30) Foreign Application Priority Data

Aug. 17, 2022     (IT) ........................ 102022000017373

(51) Int. Cl.
*B29C 45/23* (2006.01)
*B29C 45/73* (2006.01)
*B29C 45/74* (2006.01)

(52) U.S. Cl.
CPC .............. B29C 45/23 (2013.01); B29C 45/73 (2013.01); B29C 45/74 (2013.01)

(58) Field of Classification Search
CPC ......... B29C 45/23; B29C 45/73; B29C 45/74; B29C 45/2608; B29C 45/82; B29C 2945/76785; B29C 45/281; B29C 45/27; B29C 45/22; B29C 45/2725; B29C 2045/277; B29C 2045/279; B29C 2045/2817; B29C 2045/2841
See application file for complete search history.

(56) References Cited

U.S. PATENT DOCUMENTS

| | | | |
|---|---|---|---|
| 2002/0132025 A1 | 9/2002 | Lee et al. | |
| 2006/0249862 A1* | 11/2006 | Ciccone | B29C 33/046 425/556 |
| 2014/0099398 A1* | 4/2014 | Schmidt | B29C 45/281 251/62 |

FOREIGN PATENT DOCUMENTS

| | | |
|---|---|---|
| EP | 0265730 A2 | 5/1988 |
| EP | 1522396 B1 | 12/2010 |
| WO | 2010093584 A1 | 7/2010 |

* cited by examiner

*Primary Examiner* — S. Behrooz Ghorishi
(74) *Attorney, Agent, or Firm* — Rivka Friedman

(57) ABSTRACT

An apparatus for injecting a molten plastic material into a mold is described. The apparatus includes a heated manifold (manifold) with channels to distribute molten material inside it, and a heated injector, to inject molten material to the mold cavity, equipped with a translatable shutter to regulate the flow of the injected molten material.

An actuator is attached to the manifold to receive molten material from it to send to the injector and move the shutter. The actuator includes a piston connected to the plug, and a first conduit to bring a pressurized fluid from the outside to the piston. A plate includes a second internal conduit to bring pressurized fluid to the injector, where a gap separates the plate and the actuator.

A connecting member is mounted to cross the gap and carry pressurized fluid from the plate to the actuator.

20 Claims, 3 Drawing Sheets

INJECTION MOLDING APPARATUS

TECHNICAL FIELD

The invention relates to an apparatus for under-pressure injecting a molten plastic material into a mold for the production of objects. More particularly, the invention relates to an apparatus having a structure commonly referred to as a hot runner for receiving molten plastic material, pushed by a press, through a single inlet, distributing it and injecting it simultaneously into one or a plurality of cavities of a mold through one or a plurality of nozzles, the opening and closing of which is controlled by one or more movable shutters (pins).

BACKGROUND

As described also in EP0677370 (see FIGS. 2 and 4, ibid.) in well-known injection apparatuses it is necessary to bring a pressurized fluid (usually compressed air or oil) to a piston to move back and forth an opening and closing shutter of an actuator connected to an injector. For the purpose e.g. EP0925902 discloses conduits 39, 40, 41, 42 (see FIG. 1, ibid.) for supplying pressurized fluid to an injection cylinder 12. The conduits are obtained in the body of the cylinder 12 and in a plate 6 to which the cylinder 12 is coupled/fixed directly (see shutter 28). In known manner, the injector in EP0925902 is fed via a heated manifold 1.

The problem with these structures is that in operation the manifold 1 will have a high temperature (about 280/300° C., depending on the injected plastic material) as well as the cylinder body 12 attached to it, while the plate 6 will reach much lower temperatures (about 80-100° C.). Evidently, the thermal expansion will be different and with different directions (longitudinal or transverse), respectively, according to constraints and fixings set at the design stage, leading to misalignments or distortions of the components and in the conduits 39, 40, 41, 42.

SUMMARY

The main object of the invention, defined in the attached claims in which the dependent ones define advantageous variants, is to improve this state of the art.

A particular object is to improve the resilience to thermal expansion of the circuit carrying fluid under pressure to the actuator piston.

At least one object is achieved by an apparatus for injecting a molten plastic material into a mold for the production of objects, comprising:

a heated manifold with channels to distribute molten material inside it, a heated injector, for injecting molten material toward the mold cavity, equipped with a translatable shutter to regulate the flow of the injected molten material, an actuator which is fixed to the manifold to receive from it molten material to be sent to the injector, and which comprises a body provided with a chamber in which a piston connected to the shutter is translatable, and a first conduit which has a first outlet on an external surface of the actuator and extends from the first outlet through the thickness of the actuator body to the chamber to bring a pressurized fluid (e.g. air or oil) from the outside into the chamber in order to impose reciprocating motion to the piston, a plate which comprises a second internal conduit to bring pressurized fluid to the actuator, wherein the internal conduit has a second outlet on an external surface of the plate;

a gap separating the plate and actuator at said first and second outlets, a joining member, distinct from the plate and actuator, mounted to cross the gap joining the first and second outlets.

The joining member avoids the direct contact between the plate and the actuator at said first and second outlets, preventing the aforementioned problems of misalignment and thermal expansion.

Preferably, for ease of construction, the plate comprises a recess to accommodate the injector and part of the manifold.

In a variant, the plate is coupled directly to the actuator.

Preferably the apparatus comprises two plates such as the plate defined above, the plates being juxtaposed along a common edge and configured to enclose within them the injector, the actuator, and the manifold.

The manifold may also be composed of several members associated with each other, depending on the application.

In a variation, the apparatus comprises two or more injectors mounted on opposite sides of the manifold. This topology allows the molten plastic material to be distributed in a plurality of mold cavities.

Preferably the injectors and manifold are enclosed within said two plates.

Preferably, for simplicity of construction, the joining member is a sleeve or jacket with an internal axial channel; the sleeve or jacket is preferably straight to shorten the path of the pressurized fluid. The joining member may also have a curved or convoluted shape.

For easy assembly, the joining member preferably has two opposite ends, one inserted into a complementary seat of the plate and one inserted into a complementary seat (of a body) of the actuator or cylinder.

Preferably on the outer surface of at least one of said ends and/or on at least one of said ends are mounted sealing gaskets in contact with the walls of the housing in which they are inserted.

Preferably at least one of said seats comprises a wall opposite to said end inserted therein, and said end is spaced from said wall to avoid mutual contact. Such spacing allows any expansion of the joining member or seats to be tolerated.

BRIEF DESCRIPTION OF THE DRAWINGS

The advantages of the invention will be even clearer from the following description of a preferred system, in which.

DETAILED DESCRIPTION

In the figures equal members are indicated by equal numbers, and to avoid crowding the drawings sometimes only a few numbers are shown.

Figure 1:
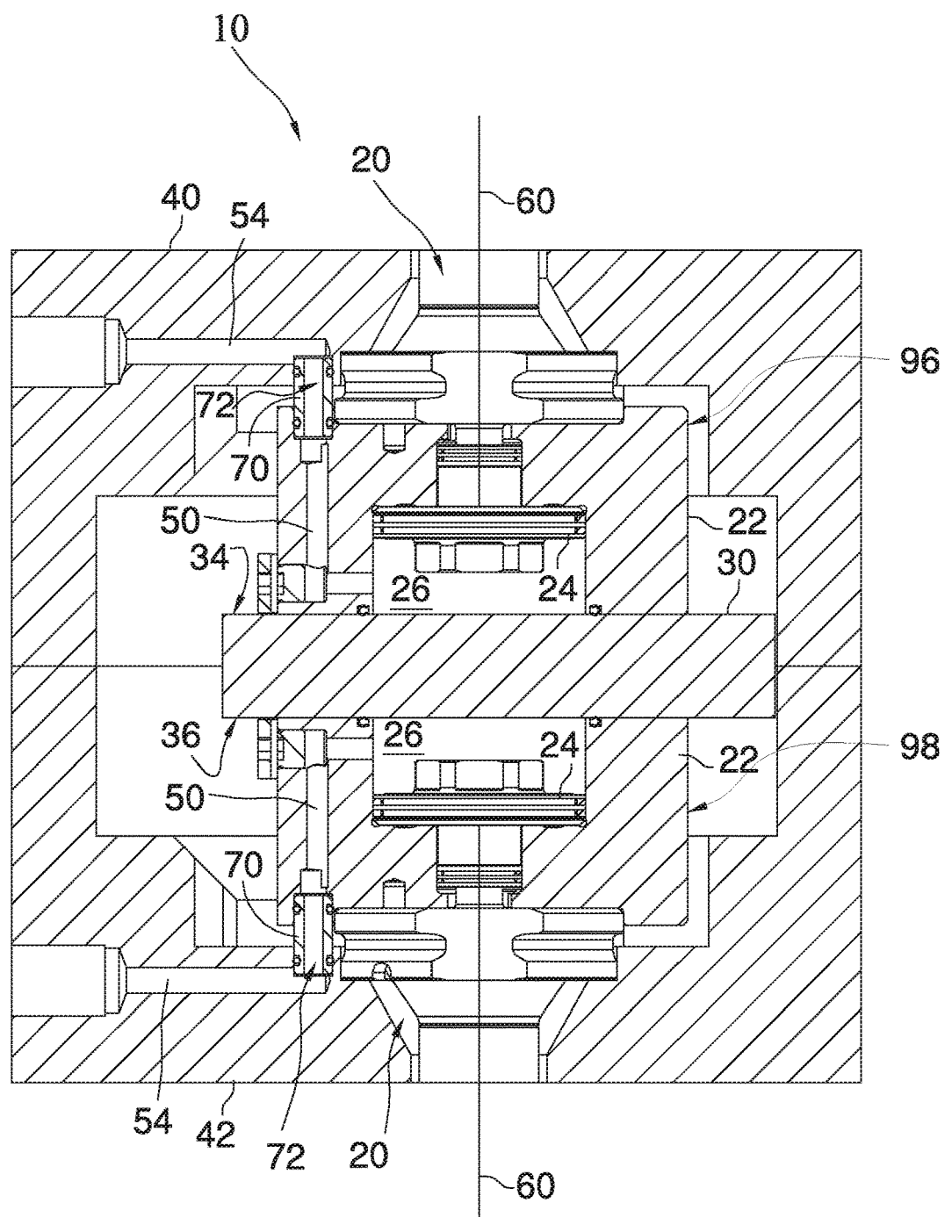
FIG. 1 shows an injection apparatus in cross-sectional view.

FIG. 1 shows a mold 10 (of the stack mold type) comprising a hot runner that is enclosed within mold plates 40, 42 suitably recessed and clamped against each other to accommodate it according to known methods and means. The hot runner comprises a known manifold 30 within which are cut passage conduits (not shown) for molten plastic material to be injected. The conduits continue through the actuator body or cylinder 22, and then through an injector to an exit nozzle.

Mounted on opposite surfaces 34, 36 of the manifold 30 are two known fluid-operated actuators 96, 98 (e.g. by oil or air) each comprising a body 22 with a piston 24 inside which is connected with a known shutter 60 (a valve pin, shown only schematically) housed movably and coaxially inside the injector 20.

The piston 24 of the actuator 96, 98 controls the reciprocating motion of the shutter 60 to dose the flow of molten plastic material exiting a nozzle (not shown). To do this, the piston 24 is linearly movable within a chamber 26 formed in the actuator body 22 and pushed, in a known manner, back and forth by the selective, alternating insertion of a pressurized fluid (e.g. air or oil) into the chamber 26.

The pressurized fluid can arrive in the chamber 26 through supply conduits 50 (FIG. 1) obtained by local emptying, e.g. by drilling with a diameter of e.g. 9 mm, of the body 22. FIG. 1 shows in detail the conduits 50, which from outside the body 22 carry fluid under pressure to one side of the piston 24 by passing through the thickness of the body 22. There are similar conduits 52 in the body 22 that carry fluid under pressure to the opposite side of the piston 24, shown in FIG. 2.

Figure 2:
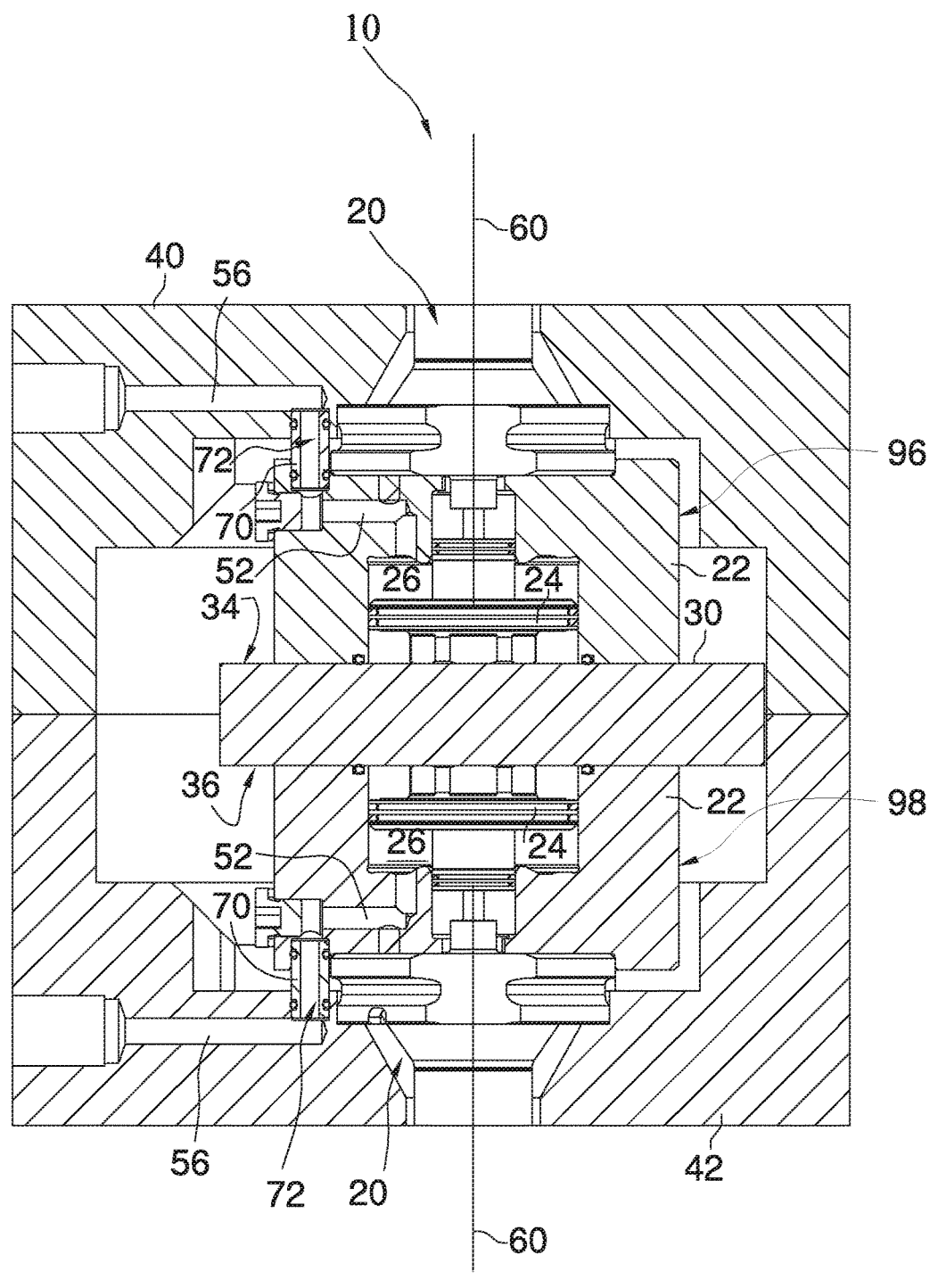
FIG. 2 shows another cross-sectional view of the apparatus in FIG. 1.

FIG. 1 shows the closing phase of the shutter, when the shutter totally closes the nozzle preventing the molten plastic material from exiting; while FIG. 2 shows the opening phase, which is when the shutter totally opens the nozzle allowing the plastic material to exit the injector toward the mold cavity.

The conduits 50, 52 of each actuator 96, 98 are fed by pressurized fluid flowing respectively within the plates 40, 42 the one on which that actuator is mounted (and with which it is in contact). For the purpose, each plate 40, 42 has conduits 54, 56 that respectively feed the conduits 50, 52.

Figure 3:
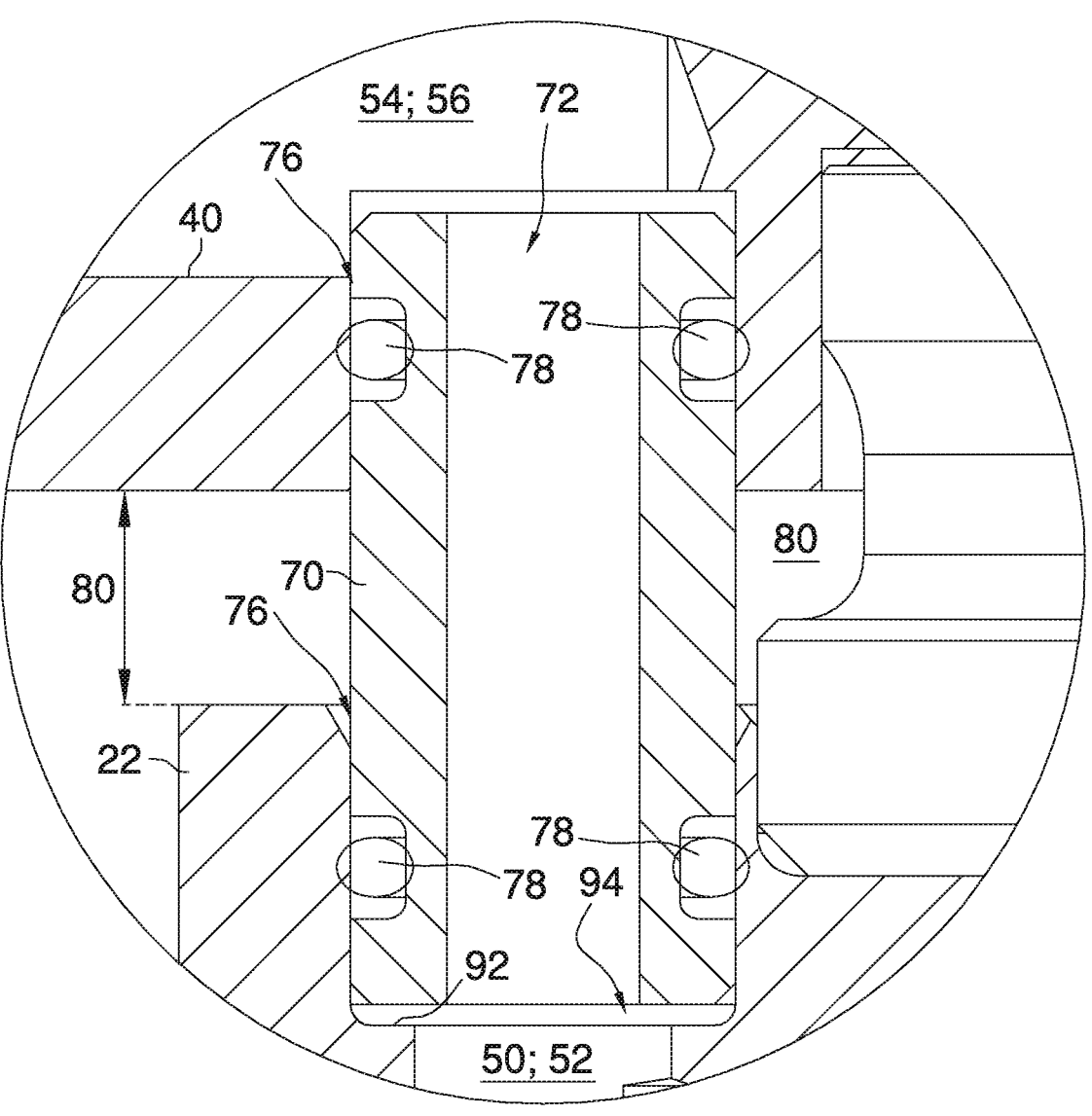
FIG. 3 shows an enlargement of FIGS. 1 and 2.

To limit and avoid the problems highlighted in the introduction, each plate 40, 42 and the respective actuator body 22 closest to it do not mutually touch at the respective conduit outlets as shown in the prior art, but remain separated by a gap 80 (FIG. 3). The outlets of the conduits 50, 52 toward the respective plate 40, 42 are thus not directly abutted against (or facing) the outlets of the conduits 54, 56 facing the body 22. Instead, the conduits 50, 52 are respectively joined to the conduits 54, 56 via a respective joining member 70 (see FIG. 3) that internally comprises a conduit 72 (e.g. with an effective diameter of 4.5 mm). The joining member 70 is mounted to cross the gap 80 present between each plate 40, 42 and the respective actuator body 22 closest thereto. The connecting member 70 then acts as a bridging member for the pressurized fluid transiting from each plate 40, 42 to the chamber 24 of the respective actuator body 22 nearest to it.

Therefore each of the conduits 50 connects with the conduit 72 of a joining member 70, which conduit 72 connects with a conduit 54 (FIG. 1), and each of the conduits 52 connects with a conduit 72 of another joining member 70, which conduit 72 connects with a conduit 56 (FIG. 2). The aforementioned connections form a continuous conduit between each plate 40, 42 and the respective actuator body 22 closest to it.

Thanks to the joining member 70 at said outlets, the body 22 and the plates 40, 42 are not in direct contact, as is the case between the body 22 and the manifold 30. Then, the different thermal expansion caused by the high temperatures of the manifold 30 and the body 22 are compensated and/or accommodated by the joining member 70 and/or the gap 80.

The heat transfer from the manifold 30 toward the plates 40, 42 is limited because the direct contact surface area is limited.

Limiting the passage of heat from the hot runner to the mold plates 40, 42 allows not only limiting the expansion of the components but also achieving energy savings from the fact that the hot runner can be heated less due to less heat leakage.

According to a preferred assembly, the opposite ends of the joining member 70 are snugly accommodated in seats or holes 76 cut in the plates 40, 42 and the actuator body 22.

More preferably, around said ends, e.g. inside complementary circular grooves, gaskets 78 are mounted to ensure sealing of the pressurized fluid.

More preferably, said ends are inserted into the seats or holes 76 loosely, that is, so that said ends have axial play with respect to the seats or holes 76. This axial play is concordant with the transverse direction of thermal expansion of the actuator and injector.

According to a preferred assembly, the seats 76 have a bottom 92 narrower than the diameter of the joining member 70. According to a more preferred assembly, the end of the joining member 70 and the bottom 92 remain separated by a certain distance or gap 94 (they are not abutting against each other) to compensate for any thermal deformation of the different components. The joining member 70 is, for example, a sleeve or tube, e.g. metallic or ceramic.

Although the figures illustrate the cross-section of a stack-mold with opposing injectors 20 placed along the same axis, a similar joining member 70 is applicable in any type of hot runner and mold, e.g. the single-injector system of EP0677370 or "single face" systems where injectors are arranged only on one face of the manifold.

The invention claimed is:

1. Apparatus for injecting a molten plastic material into a mold for making objects, comprising:
   a heated manifold with channels for distributing molten material inside it,
   a heated injector, for injecting molten material into a mold cavity, provided with a translatable shutter to regulate the flow of the injected molten material,
   an actuator that is attached to the manifold for receiving therefrom molten material to be sent to the injector, and comprises a body provided with
      a chamber in which a piston connected to the shutter is translatable, and
      a first conduit which has a first outlet on an external surface of the actuator and which extends from the first outlet through the thickness of the actuator body to the chamber to bring a pressurized fluid from the outside into the chamber in order to impose a reciprocating movement to the piston,
   a plate which comprises a second internal conduit for bringing the pressurized fluid to the actuator, wherein the second internal conduit has a second outlet on an external surface of the plate;
   a gap that separates the plate and the actuator at said first and second outlet,
   a joining member, distinct from the plate and the actuator, mounted to cross the gap and connect the first and second outlet.

2. Apparatus according to claim 1, wherein the plate comprises a recess for housing the injector and part of the manifold.

3. Apparatus according to claim 2, wherein the plate is coupled directly to the actuator.

4. Apparatus according to claim 3, wherein the joining member is a sleeve or a jacket with an inner axial channel for the fluid.

5. Apparatus according to claim 3, wherein the joining member has two opposite ends, one inserted in a complementary seat of the plate and one inserted into a complementary seat of the actuator.

6. Apparatus according to claim 5, wherein on the external surface of at least one of said ends, a sealing gasket is mounted in contact with the walls of the seat in which it is inserted.

7. Apparatus according to claim 2, wherein the joining member is a sleeve or a jacket with an inner axial channel for the fluid.

8. Apparatus according to claim 2, wherein the joining member has two opposite ends, one inserted in a complementary seat of the plate and one inserted into a complementary seat of the actuator.

9. Apparatus according to claim 1, wherein the plate is coupled directly to the actuator.

10. Apparatus according to claim 9, wherein the joining member is a sleeve or a jacket with an inner axial channel for the fluid.

11. Apparatus according to claim 9, wherein the joining member has two opposite ends, one inserted in a complementary seat of the plate and one inserted into a complementary seat of the actuator.

12. Apparatus according to claim 11, wherein on the external surface of at least one of said ends, a sealing gasket is mounted in contact with the walls of the seat in which it is inserted.

13. Apparatus according to claim 1, comprising two plates as the plate defined in claim 1, said plates being placed side by side along a common edge and configured to enclose within them the injector, the actuator and the manifold.

14. Apparatus according to claim 1, comprising two or more injectors mounted on opposite sides of the manifold for injecting molten material in opposite directions.

15. Apparatus according to claim 1, wherein the joining member is a sleeve or a jacket with an inner axial channel for the fluid.

16. Apparatus according to claim 1, wherein the joining member has two opposite ends, one inserted in a complementary seat of the plate and one inserted into a complementary seat of the actuator.

17. Apparatus according to claim 16, wherein on the external surface of at least one of said ends, a sealing gasket is mounted in contact with the walls of the seat in which it is inserted.

18. Apparatus according to claim 17, wherein on at least one of said ends, a sealing gasket is mounted in contact with the walls of the seat in which it is inserted.

19. Apparatus according to claim 16, wherein on at least one of said ends, a sealing gasket is mounted in contact with the walls of the seat in which it is inserted.

20. Apparatus according to claim 16, wherein at least one of said seats comprises a wall opposite to said end inserted therein, and said end is spaced from said wall to avoid mutual contact.

* * * * *